June 8, 1971    D. A. BROWN ET AL    3,583,014

DOCKBOARD ASSEMBLY

Filed Jan. 22, 1970

INVENTORS
*Douglas A. Brown, &*
BY *Robert C. Beckwith*

*Barnard, McGlynn & Reising*
ATTORNEYS

United States Patent Office 3,583,014
Patented June 8, 1971

3,583,014
DOCKBOARD ASSEMBLY
Douglas A. Brown and Robert C. Beckwith, Milwaukee, Wis., assignors to Loomis Machine Company, Clare, Mich.
Filed Jan. 22, 1970, Ser. No. 4,911
Int. Cl. B65g 11/00
U.S. Cl. 14—71                    11 Claims

ABSTRACT OF THE DISCLOSURE

A dockboard assembly for extending between a dock and an adjacent vehicle including a support structure with a platform section pivotally connected to the support structure and a lip section pivotally connected to the platform section. The assembly includes a torsion bar having an elongated portion rotatably supported by the support structure with a first end non-rotatably attached to the support structure and a second end extending transversely to the elongated portion and disposed in spaced relationship with the platform section. An adjustment link including male and female members threadedly connected together pivotally interconnects the platform section and the second end portion of the torsion bar for adjusting the torsional moment applied to the platform section by the torsion bar.

---

There are various dockboards known in the prior art which include a lip section pivotally connected to a platform section. The lip section may be pivoted to a position in general alignment with the platform section so as to form an extension thereof. In normal operation for loading and unloading a vehicle adjacent the dock, the platform section is disposed near the upper surface of the dock and the lip section extends from the platform section with its distal end resting upon the adjacent vehicle, such as the bed of a truck or a railroad car.

Such dockboards include a lift means which reacts between the support structure and the platform section for urging the platform section to pivot upwardly toward a raised position. The instant invention relates to such a dockboard assembly wherein a torque bar is utilized to urge the platform section to pivot upwardly. In this assembly both the lip and platform sections are manually pivoted upwardly to the position where the platform section is extending upwardly and the lip section forms an extension thereof. During this manual upward movement, the torque bar assists in pivoting the platform section upwardly. Once the lip and platform section are pivoted upwardly they are manually lowered until the lip section is supported on the adjacent vehicle.

Torque bars have been utilized in dockboard assemblies in the past as is exemplified by the dockboard assembly shown in U.S. Pat. No. 3,249,956. In dockboard assemblies utilizing such torque bars it is necessary to provide the capability to adjust the force or moment applied to the platform section by the torque bar once the dockboard assembly has been installed. In the dockboard assembly described in the aforementioned patent, there is frictional sliding relative motion between the ramp or platform section and the ends of the torsion bar and the parts which slide relative to one another are subject to wear and such an assembly is therefore not satisfactory in all situations.

Accordingly, it is an object and feature of this assembly to provide a dockboard assembly including a torsion bar with an adjustable link pivotally interconnecting one end of the torsion bar and the platform section.

Other objects and attendant advantages of the present invention will be readily appreciated as the same becomes better understood by reference to the following detailed description when considered in connection with the accompanying drawings wherein.

Figure 1:
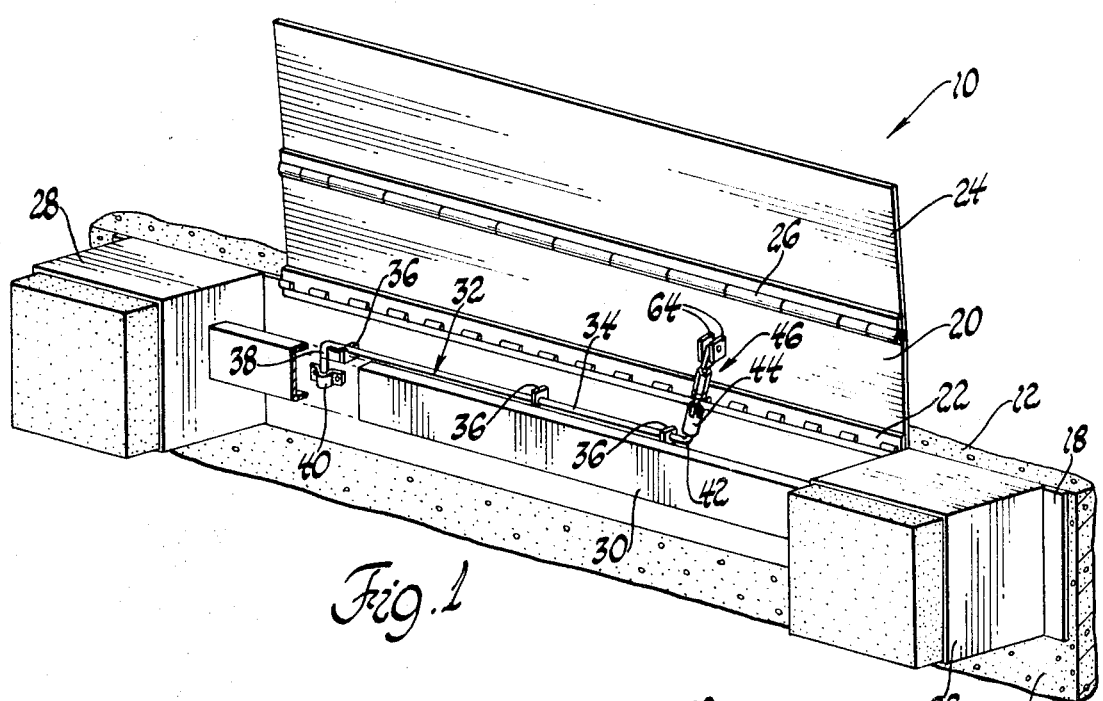
FIG. 1 is a perspective view of a preferred embodiment of the instant invention showing the platform and lip sections in the raised extended positions.
Figure 2:
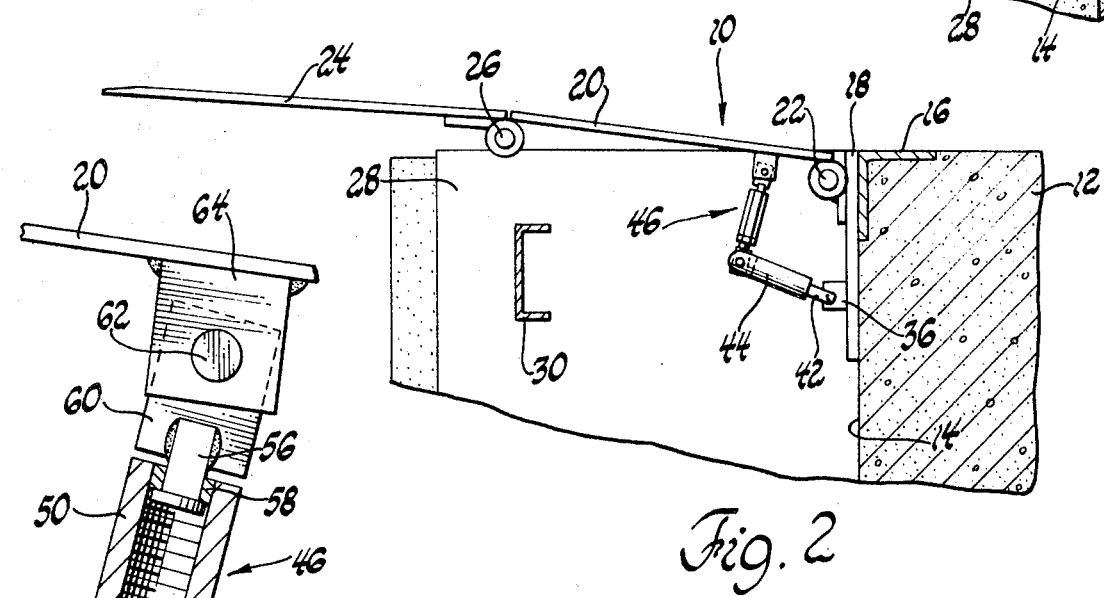
FIG. 2 is a cross sectional side view of the preferred embodiment showing the lip and platform sections in the position for facilitating the movement of traffic between the dock and an adjacent vehicle.
Figure 3:
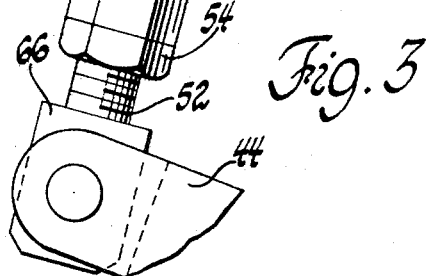
FIG. 3 is an enlarged fragmentary cross sectional view of a preferred embodiment of the adjustable link utilized in the instant invention.

Referring now to the drawings wherein like numerals indicate like or corresponding parts throughout the several views, a dockboard assembly constructed in accordance with the instant invention is generally shown at 10. The dockboard assembly 10 extends between a dock 12 and an adjacent vehicle (not shown) when in the position illustrated in FIG. 2. The dock 12 is frequently made of cement and includes a front wall 14.

The dockboard assembly 10 includes a support structure comprising the channel member 16 and a plate 18 which are secured to the dock 12 for positioning the dockboard assembly 10 on the front wall 14 of the dock.

A platform section 20 is pivotally connected by a hinge 22 to the plate 18 of the support structure for movement between raised and lowered positions.

There is also included a lip section 24 which is pivotally connected through a piano-type hinge 26 to the platform section for movement between an extended position in prolongation of the platform section 20 and a pendent position perpendicular to the platform section.

There is also included bumper means 28 extending outwardly from the plate 18 of the support structure at each end of the platform section 20. A channel-shaped beam 30 extends between the bumper means 28 for engaging and supporting the platform section 20 when the latter is in the lowered position. In other words, the platform section 20 may be pivoted downwardly from the position shown in FIG. 2 to rest upon the top of the beam 30 so as to be supported in the storage or non-use position. When the platform section 20 is resting upon the beam 30, the lip section 24 hangs downwardly under the force of gravity so as to depend therefrom.

It will be noted that the platform section 20 extends a lesser distance from the plate 18 of the support structure than the bumper means 28 extends from the plate 18 of the support structure. Also the lip and platform sections are generally of the same size.

A torsion bar generally indicated at 32 includes an elongated section 34 which is rotatably supported by the plate 18 of the support structure through the brackets 36. The torsion bar 32 includes a first downwardly turned end portion 38 which is generally perpendicular to the elongated portion 34 and is non-rotatably attached to the plate 18 of the support structure by a generally U-shaped channel member 40. In other words, the member 40 is disposed about the end of the torsion bar to prevent the first end portion 38 from moving outwardly away from the plate 18. The torsion bar 32 includes a second end portion 42 which extends transversely to the elongated portion 34 and is disposed in spaced relationship to the platform section 20. The second end portion 42 of the torsion bar 32 includes a yoke 44.

Adjustment means generally indicated at 46 is pivotally connected at one end to the platform section 20 and is pivotally connected at the other end to the yoke 44 for adjusting the distance between the second end portion 42 of the torsion bar 32 and the platform section 20.

The adjustment means 46 includes an adjustable link having first and second telescoping parts with one of the parts pivotally connected to the platform section 20 and the other part pivotally connected to the yoke 44. More specifically, the first part includes a female threaded member 50 and the second part includes a male threaded member 52, the male threaded member 52 being threaded into the female member 50. A locking nut 54 threadedly engages the male member 52 for abutting engagement with the end of the female member 50 for preventing relative rotation between the male and female members. The female member 50 is an elongated member having a polygonal or hexagonal cross section. The first part, besides including the female member 50, includes a stud 56 rotatably attached to the female member 50. The stud 56 has a head and is retained within the female member 50 by an insert 58 which is secured to the female member 50 and which rotatably supports the stud 56. The first part further includes a first connector plate 60 which is welded or otherwise secured to the stud 56 and has a hole therethrough through which the pin 62 extends.

A pair of plates 64 extend from the platform section 20 for receiving the connector plate 60 therebetween and supporting the pin 62 so as to pivotally attach the adjustable link to the platform section 20.

The male member includes a second connector plate 66 which has a hole therethrough and the yoke 44 has a bifurcated end for receiving the connector plate 66 with a pin extending through the yoke 44 and the second connector plate 66 for pivotally connecting the adjustable link to the torsion bar 32.

Thus, by rotating the female member 50 relative to the male member 52 the distance between the pivotal connections of the adjustable link to the platform section and to the torsion bar respectively can be adjusted so as to vary the amount of torque or moment applied to the platform section by the elongated portion 34 of the torsion bar 32 as the elongated portion 34 twists during pivotal movement of the platform section 20.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A dockboard assembly for extending between a dock and an adjacent vehicle, said assembly comprising: a support structure; a platform section pivotally connected to said support structure for movement between raised and lowered positions; a torsion bar having an elongated portion rotatably supported by said support structure and a first end portion non-rotatably attached to said support structure and a second end portion extending transversely to said elongated portion and disposed in spaced relationship to said platform section; adjustment means pivotally connected at one end to said platform section and pivotally connected at the other end to said second end portion of said torsion bar for adjusting the distance between said second end portion of said torsion bar and said platform section.

2. An assembly as set forth in claim 1 wherein said adjustment means includes an adjustable link.

3. An assembly as set forth in claim 2 wherein said adjustable link includes first and second telescoping parts with one of said parts pivotally connected to said platform section and the other pivotally connected to said second end portion of said torsion bar.

4. An assembly as set forth in claim 3 wherein said first part includes a female threaded member and said second part includes a male threaded member threaded into said female member.

5. An assembly as set forth in claim 4 including a locking nut threadedly engaging said male member for abutting engagement with said female member for preventing relative rotation therebetween.

6. An assembly as set forth in claim 5 wherein said second end portion of said torsion bar includes a yoke pivotally connected to one of said parts of said adjustable link.

7. An assembly as set forth in claim 6 wherein said female member comprises an elongated member having a polygonal cross section and said first part further includes a stud rotatably attached to said female member and a first connector plate secured to said stud.

8. An assembly as set forth in claim 7 including a lip section pivotally connected to said platform section for movement between an extended position in prolongation of said platform section and a pendent position generally perpendicular to said platform section.

9. An assembly as set forth in claim 8 including bumper means extending outwardly from said support structure at each end of said platform section, a beam extending between said bumper means for engaging and supporting said platform section when the latter is lowered.

10. An assembly as set forth in claim 9 wherein said male member includes a second connector plate and said yoke has a bifurcated end for receiving one of said connector plates and a pair of plates extend from said platform section for receiving the other of said connector plates.

11. An assembly as set forth in claim 10 wherein said platform section extends a lesser distance from said support structure than said bumper means extend from said support structure.

References Cited

UNITED STATES PATENTS 3,249,956    5/1966    Zajac _____ 14—71
3,476,375   11/1969    Brasseur _____ 267—57

JACOB L. NACKENOFF, Primary Examiner

U.S. Cl. X.R.

16—180; 49—386; 267—57; 296—76